Oct. 13, 1936.  J. WOLFINGER  2,057,355
BEET CUTTING MACHINE
Filed Nov. 5, 1934  3 Sheets—Sheet 1
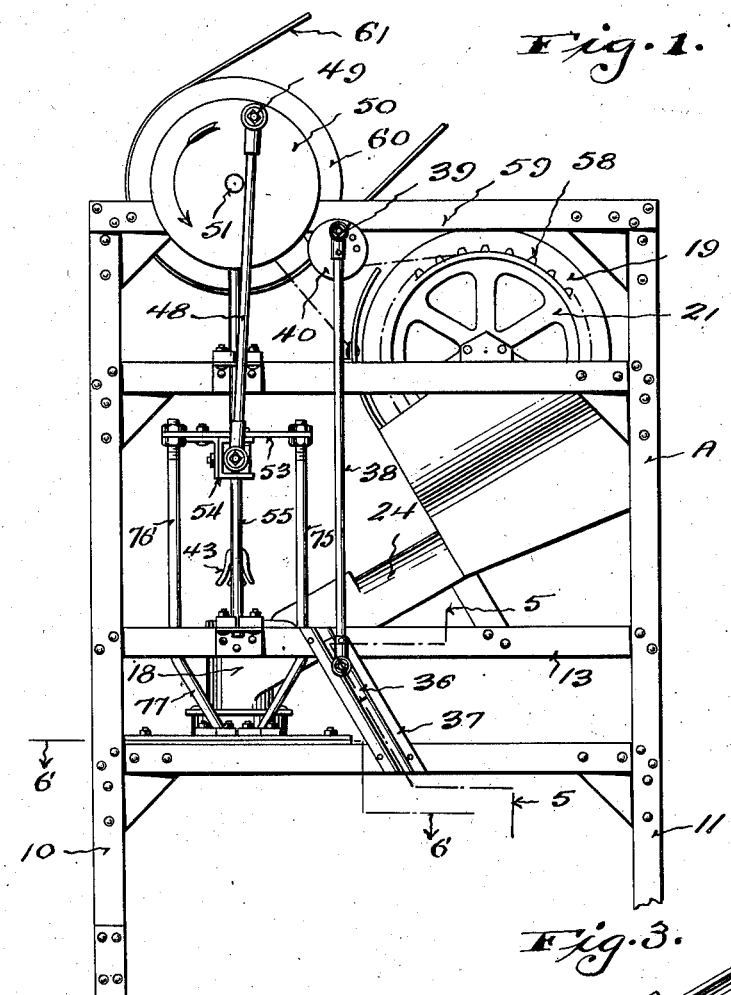
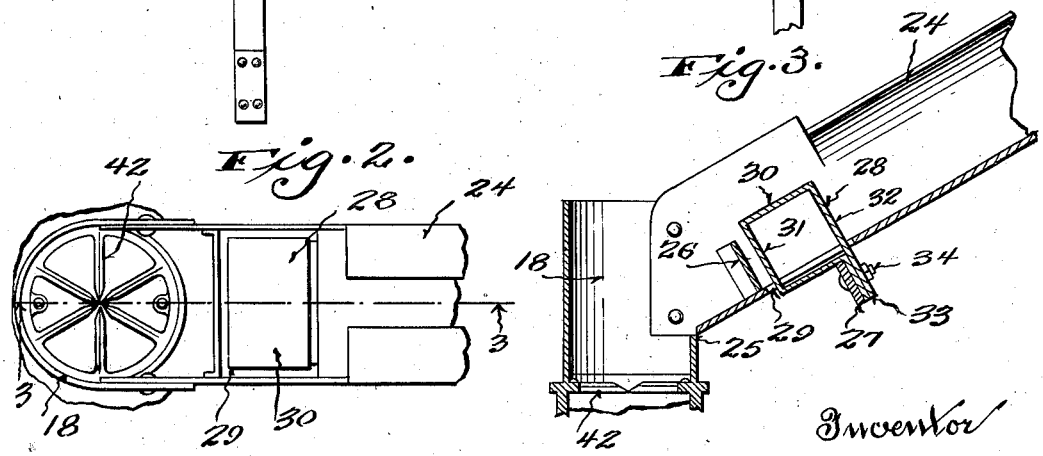
Inventor
J. Wolfinger Oct. 13, 1936.  J. WOLFINGER  2,057,355
BEET CUTTING MACHINE
Filed Nov. 5, 1934  3 Sheets-Sheet 2
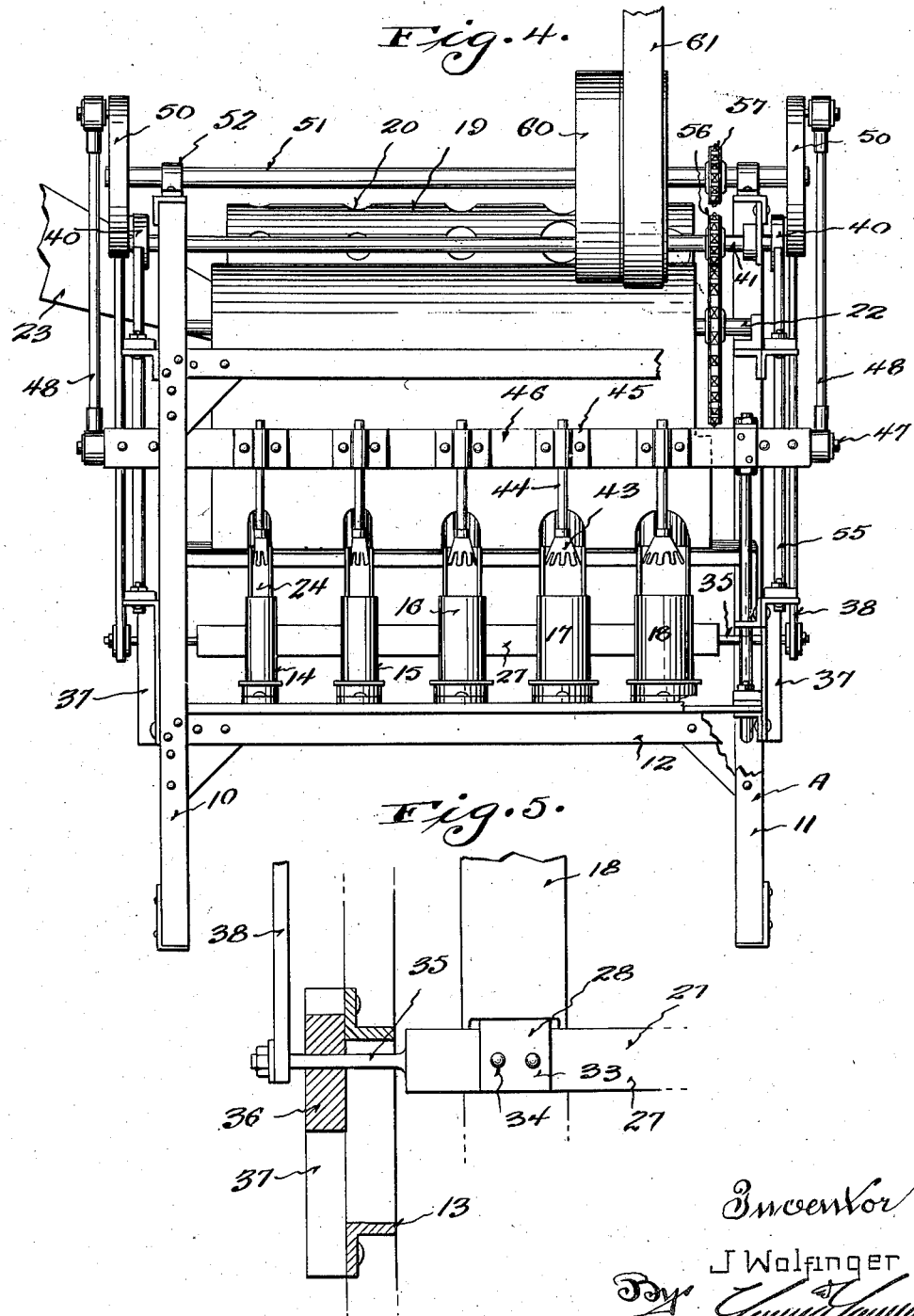
Inventor
J Wolfinger
By
Attorneys Oct. 13, 1936.  J. WOLFINGER  2,057,355

BEET CUTTING MACHINE

Filed Nov. 5, 1934  3 Sheets-Sheet 3

Inventor
J. Wolfinger

Patented Oct. 13, 1936

2,057,355

UNITED STATES PATENT OFFICE 2,057,355

BEET CUTTING MACHINE

Joseph Wolfinger, Dundas, Wis.

Application November 5, 1934, Serial No. 751,550

3 Claims. (Cl. 146—169)

This invention appertains to vegetable cutters and slicers, and more particularly to a machine especially susceptible for cutting beets into the desired sizes for canning, and is an improvement on my pending application filed November 6, 1931, Serial No. 573,354.

One of the salient objects of my invention is the provision of novel means for feeding the beets one at a time from the delivery hopper to the individual hoppers, or cutting cups, whereby the overloading of the individual hoppers, or cups, is prevented.

Another important object of my invention is to provide a rigid stop, or abutment, for the beets or other vegetables, in each trough leading from the delivery hopper in advance of the cutting cups, with a novel reciprocating gate for lifting the beets one at a time over the abutment and into the cutting cups in proper timed relation to the plungers utilized in forcing the beets through the cutting knives carried by the cups.

A further object of my invention is to provide novel means disposed below the cutting cups for severing large beets in halves or thirds after the same have been sliced by the radial knives in the cups, the cutting means below the cups including longitudinal blades arranged at an angle, whereby to produce a shear cut so as to insure ease in the operation of the machine.

A still further object of my invention is the provision of swinging bars extending the full width of the machine and disposed on opposite sides of the cups and below the same, with means for swinging the bars on their pivots toward and away from one another, the bars carrying the cutting knives for severing the beets, as the same leave the cups, into thirds or halves, as the case may be, the knives terminating short of certain of the cups, whereby the smaller beets will not be acted upon by the moving knives.

A still further object of my invention is to provide novel means for simplifying the entire arrangement of the beet cutting or slicing machine, whereby the same will be durable and efficient in use, and capable of operating at high speed.

With these and other objects in view, the invention consists in the novel construction, arrangement and formation of parts, as will be hereinafter more specifically described, claimed and illustrated in the accompanying drawings, in which drawings:

Figure 1 is a side elevation of my improved machine.

Figure 2 is a fragmentary top plan view of one of the feeding troughs, illustrating the means employed for delivering one beet at a time to the receiving cup.

Figure 3 is a longitudinal section through one of the feeding troughs and slicing cups, showing the delivery gate in its raised position for lifting a beet over the abutment.

Figure 4 is a front elevation of the complete machine with parts thereof broken away to illustrate structural details.

Figure 5 is a detail section taken on the line 5—5 of Figure 1, looking in the direction of the arrows, illustrating the means employed for simultaneously actuating the reciprocating gates.

Figure 6:
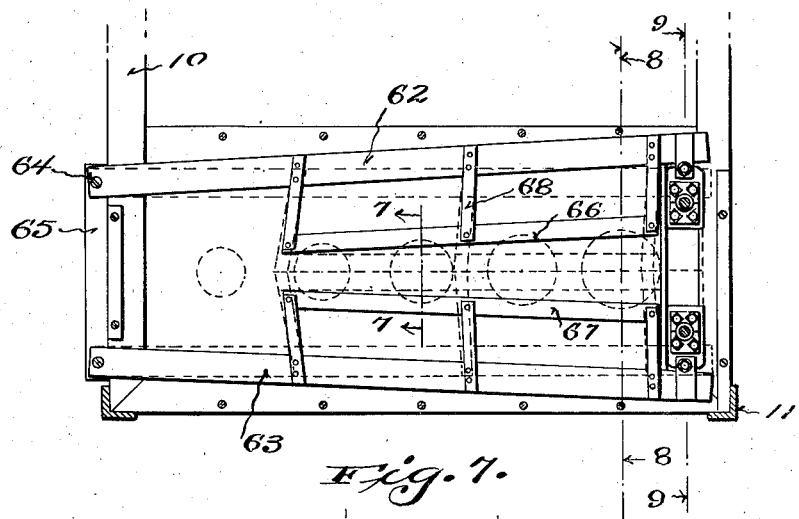
Figure 6 is a fragmentary horizontal section taken substantially on the line 6—6 of Figure 1, looking in the direction of the arrows, illustrating the arrangement of the swinging knives for cutting the beets below the slicing cups.
Figure 7:
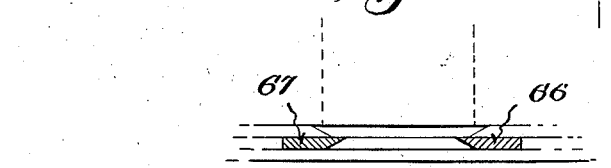
Figure 7 is a detail transverse section through the cutting knives, showing the means for severing medium sized beets in half below the cups.
Figure 8:
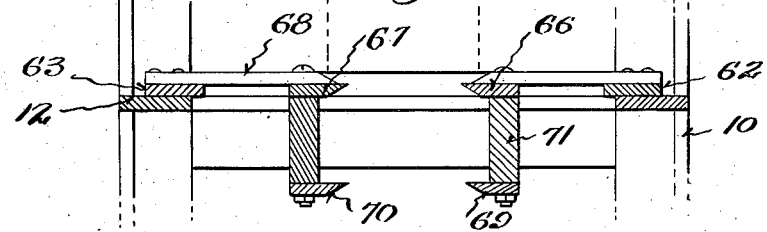
Figure 8 is a transverse sectional view through the knives, illustrating the means for severing large beets into thirds.
Figure 9:
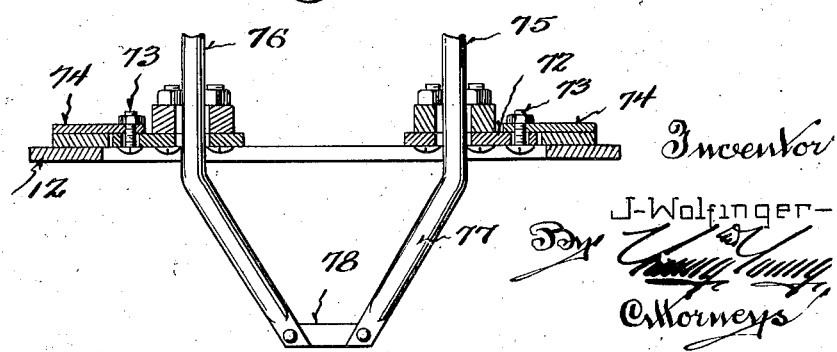
Figure 9 is a fragmentary vertical section taken substantially on the line 9—9 of Figure 6, illustrating the means for operating the swinging knives and carrier bars.

Referring to the drawings in detail, wherein similar reference characters designate corresponding parts throughout the several views, the letter A generally indicates my improved beet cutting and slicing machine, which comprises a supporting frame 10, preferably formed from angle iron or similar structural steel or iron units.

As shown, the frame 10 includes corner legs 11 suitably connected together by front and rear transverse bars 12 and side longitudinally extending bars 13.

At the front of the machine, adjacent to the lower end thereof, is arranged a row of cups, or individual beet receiving hoppers, 14, 15, 16, 17 and 18. In the present instance, I have only shown five of these cups, or individual beet receiving hoppers, but it is to be understood that the machine can be provided with as many of these cups as may be desired.

By referring to Figure 4, it will be noted that the cups are formed in different sizes, and thus the cup 14 is adapted to receive small beets, the cups 15 and 16 intermediate sizes of beets, and the cups 17 and 18 the larger sizes of beets.

The beets are delivered to the cups, or individual hoppers, from a grader 19 arranged at the upper rear part of the machine, and this grader 19 can be of any desired character. In the present instance, I have shown the same formed from a cylindrical body of sheet metal, having a series of different sized grading openings 20 therein, with the smaller openings arranged at the left-hand side (referring to Figure 4). The ends of the metal grading cylinder are supported by spiders or like members 20 rotatably mounted upon a supporting shaft 22, supported by the frame of the machine.

The beets or other vegetables are fed into the grader 19 from a laterally extending chute 23, and the small beets are adapted to fall through the first small openings, the intermediate sized beets through the next openings, and the larger beets through the largest openings at the right-hand side of the grader. These different sizes of beets are delivered through delivery troughs 24 to the proper sized cups 14, 15, 16, 17 and 18.

All of the troughs are constructed identical, and thus only one will be described in detail.

Each trough is arranged at an angle to the horizontal and leads from below the grader forwardly and downwardly to its respective cup, and the cup has its side cut away, as at 25, to receive the trough. Thus, as the beets are delivered from the grader, the same roll down their troughs to the cups.

It is highly desirable that only one beet be delivered at a time to each cup, and hence I have provided novel means for carrying out this purpose. Extending transversely across each trough, directly in rear of the cups, is an abutment, or stop plate, 26 which checks the downward movement of the beets.

Extending transversely across the machine and below the troughs is a reciprocating bar 27. This bar 27 has bolted thereto, at spaced points, gates 28, which are movable through openings 29 formed in the troughs directly in rear of the abutments. These gates are in the nature of elevators, or lifts, and are adapted to move one beet at a time over the abutments.

As shown, each gate, or lift, is formed from metal and includes a connecting top wall 30 and parallel front and rear walls 31 and 32. These walls are extended to provide flanges 33, which form the means for connecting the gates, or lifts, with the reciprocating bar. The flanges can be spot welded or bolted, as at 34, to the cross-bar. Each gate, or lift, is formed approximately the size of the beet which it is to elevate, and thus the gates, or lifts, conform to the transverse dimensions of the troughs.

Obviously, when the gates, or lifts, are in their lowered positions, the beets will roll down the troughs, over the top wall 30 and against the abutments 26. When the gates are raised, the top walls 30 will elevate the beets and lift the same over the abutments, whereby the beets will drop into the cups.

The terminals of the reciprocating bar 27 carry stub shafts 35, which are received within slide blocks 36 mounted in inclined guides 37 bolted or otherwise secured to the frame of the machine.

The stub shafts 35 have connected therewith pitman rods 38, the upper ends of which are connected to crank-pins 39 eccentrically carried by wheels 40. These wheels 40 are keyed or otherwise secured to a transversely extending driven shaft 41, suitably mounted in bearings supported by the frame. This shaft 41 is operated by means which will be later set forth.

Each of the individual hoppers, or cups, 14, 15, 16, 17 and 18 carry radially extending slicing knives 42, and these knives have their sharpened edges disposed uppermost. As the beets drop into the cups and onto the radial knives 42, means is provided for forcing the beets through the cups and past the radial knives, whereby the beets will be cut into the desired number of slices.

The means provided for forcing the beets through the cups includes a plurality of plunger heads 43 carried by depending plunger rods 44. By referring to Figure 4, it can be seen that a plunger 43 is provided for each cup, and that the plungers conform to the varying sizes of the cups.

All of the plunger rods 44 are rigidly secured, as at 45, to a transversely extending reciprocating operating bar 46. This bar 46 extends beyond the sides of the frame, and its terminals also carry pintles 47 on which are mounted connecting, or pitman, rods 48. The upper ends of the pitman rods 48 are connected to eccentric crank-pins 49 carried by wheels 50. These wheels 50 are keyed or otherwise secured to the main drive shaft 51 rotatably mounted in bearings 52 carried by the frame.

The reciprocating cross-bar 46 carries cross-heads 53, and these cross-heads in turn are provided with guides 54 slidably mounted on vertical guide rods 55 rigidly connected with the frame 10. Thus, the reciprocating bar 46 is efficiently guided during its raising and lowering movement.

The plungers 43 and the gates, or lifts, 28 are operated in proper timed relation, so that the beets will be delivered to the cups when the plungers are in their raised position. Any desired means can be provided for operating the shaft 41 from the main drive shaft 51, but, in the present instance, I have shown these shafts provided respectively with sprocket wheels 56 and 57.

The shaft 22, which supports the grader 19, is provided with a relatively large sprocket wheel 58, and a sprocket chain 59 is trained about all of the mentioned sprocket wheels. Thus, upon operation of the shaft 51, the grader and the shaft 41 will be actuated therewith.

Any desired means can be provided for operating the shaft 51, and, in the present instance, I have shown the same provided with pulley wheels 60, around which is trained a pulley belt 61 leading from a line shaft (not shown).

In the large and medium sized beets, it is necessary that the same be cut in halves or thirds besides being sliced by the radial knives 42. Hence, I have provided novel means for cutting the medium sized beets in half, and the largest size of beets in thirds below the cups.

The means provided for cutting the beets below the cups forms one of the salient features of my present invention, as it is highly essential that an efficient and easily operated mechanism be provided.

This cutting mechanism includes transversely extending operating and carrying bars 62 and 63. These bars extend the full width of the machine on opposite sides of the cups and are pivotally connected, as at 64, to a supporting plate 65 rigidly connected to the frame 10. Thus, from the description so far, it can be seen that the bars 62 and 63 are pivotally mounted at one of their ends and can move toward and away from the cups.

These bars 62 and 63 preferably diverge away from one another, and the same support and carry top cutting knives 66 and 67. These knives 66 and 67 extend on opposite sides of the cups 15, 16, 17 and 18, and terminate short of the cup 14.

Thus, these knives will only cut the intermediate and large sizes of beets, and will not cut the small size of beets. If preferred, more than one cup can be provided for the small size of beets.

The knives 66 and 67 are rigidly bolted to laterally extending arms 68 bolted to the pivot bars 62 and 63, and the knives are so arranged that the sharpened edges thereof will meet below the diametric center of the cups 15, 16, 17 and 18 when the knives are in their closed position.

As heretofore suggested, the larger size of beets can be cut in thirds, and thus additional knives 69 and 70 can be carried in spaced parallel relation to the knives 66 and 67. The knives 69 and 70 are only carried for a short length of the knives 66 and 67, so as to only act on the beets forced through, say, the cups 17 and 18. Spacing blocks 71 can be utilized for holding the knives 69 and 70 in proper spaced relation to the knives 66 and 67.

The means for operating the bars 62 and 63 and their knives includes slide heads 72 pivotally connected, as at 73, to strap arms 74, which are in turn connected to the pivoted bars 62 and 63. The slide heads 72 loosely and slidably receive operating rods 75 and 76, which are rigidly connected with the terminals of the cross-head 53. The lower terminals of the rods 75 and 76 are provided with inclined portions 77, which gradually converge toward one another, and the lower ends of the inclined portions 77 of the rods can be rigidly connected together, as at 78, for bracing purposes.

As the cross-head 53 raises, the inclined portions 77 of the rods, moving through the enlarged openings in the slide plates, move the slide plates toward one another, and consequently swing the pivot and supporting bars 62 and 63 toward one another, giving the knives their cutting stroke, which brings about the desired severing of the beets. As the knives are arranged parallel to the pivot bars 62 and 63, the knives will move inwardly at an angle, which brings about the desired shear cut on the beets. As the cross-head 53 lowers, the rods will be elevated, moving the knives back to their open position.

In operation of the improved beet cutter, the beets are continuously fed into the grader 19, and the different sizes of beets are delivered to the troughs 24, and are then fed one at a time into the cups. As the shaft 51 rotates, the plunger heads 43, the gates 28, and the pivoted knives all actuate in proper timed relation, and the beets are forced through the cups by the plungers partly (substantially three-fourths), past he radial knives and are then severed into the desired portions by the moving knives. When the next beet drops into the cup and the plunger lowers, the beet in the cup forces the beet ahead all of the way past the radial knives.

From the foregoing description, it can be seen that I have provided an exceptionally simple and durable machnie in which the beets are positively fed one at a time to the cutting cups, and efficiently severed below the cups into the desired portions.

Changes in details may be made without departing from the spirit or the scope of this invention, but what I claim as new is:

1. In a vegetable cutter, a plurality of receiving hoppers of different sizes, inclined troughs leading to the receiving hoppers, means for delivering graded vegetables to the troughs, a reciprocating bar movable toward and away from the receiving hoppers, plungers carried by the bar movable in the receiving hoppers, a drive shaft, means for regulating the flow of vegetables through the troughs and into the receiving hoppers including, a stationary abutment in each trough, a transversely extending cross-bar disposed below the troughs, independent gates carried by the last mentioned cross-bar movable into the troughs for lifting vegetables one at a time over the abutments, and means for operating the bars in proper timed relation from the drive shaft.

2. In a vegetable cutter, a plurality of receiving hoppers, means for feeding vegetables one at a time to the hoppers, reciprocating plungers for forcing the vegetables through the hoppers, a pair of bars extending longitudinally of the hoppers, means pivotally mounting one end of the bars on opposite sides of the hoppers, means for swinging the bars on their pivots toward and away from one another, inwardly directed arms secured to the bars, knives secured to the arms and extending in spaced parallel relation to the bars and disposed on opposite sides of the hoppers, the knives terminating short of certain of the hoppers, and additional knives carried by the first knives in spaced parallel relation disposed below certain of the hoppers.

3. In a vegetable cutter, a plurality of receiving hoppers, means for feeding vegetables one at a time to the hoppers, reciprocating plungers for forcing the vegetables through the hoppers, a pair of bars extending longitudinally of the hoppers, means pivotally mounting one end of the bars on opposite sides of the hoppers, means for swinging the bars on their pivots toward and away from one another, inwardly directed arms secured to the bars, knives secured to the arms and extending in spaced parallel relation to the bars and disposed on opposite sides of the hoppers, the knives terminating short of certain of the hoppers, additional knives carried by the first knives in spaced parallel relation disposed below certain of the hoppers, and means for operating the plungers in proper timed relation to the knife operating means.

JOSEPH WOLFINGER.